United States Patent [19]

Krude

[11] 4,020,650
[45] May 3, 1977

[54] CONSTANT VELOCITY UNIVERSAL JOINT AND BALL GROOVES THEREFOR

[75] Inventor: Werner Krude, Neunkirchen, Germany

[73] Assignee: Lohr & Bromkamp GmbH, Offenbach (Main), Germany

[22] Filed: Jan. 12, 1976

[21] Appl. No.: 648,380

[52] U.S. Cl. .................................. 64/21; 64/8
[51] Int. Cl. ................................. F16d 3/30
[58] Field of Search .................. 64/21, 8, 7

[56] References Cited

UNITED STATES PATENTS

| | | | |
|---|---|---|---|
| 3,002,364 | 10/1961 | Bellomo | 64/21 |
| 3,237,429 | 3/1966 | Biabaud | 64/21 |
| 3,370,441 | 2/1968 | Aucktor | 64/21 |
| 3,553,979 | 1/1971 | Naguchi et al. | 64/21 |

Primary Examiner—Samuel Scott
Assistant Examiner—Randall Heald
Attorney, Agent, or Firm—Edmund M. Jaskiewicz

[57]. ABSTRACT

A constant velocity universal joint has an outer joint member with an axial bore therethrough and an inner joint member within the bore. A plurality of torque transmitting elements, such as balls, are positioned within pairs of opposed grooves formed in the facing surfaces of the inner and outer joint members. The balls are retained in a ball plane in openings in a cage positioned between the inner and outer joint members. The number of balls is at least six and is divisible by a whole number larger than one but less than the number of balls. The balls are so disposed around the axis of the joint that no one ball is diametrically opposed from any other ball.

2 Claims, 7 Drawing Figures

CONSTANT VELOCITY UNIVERSAL JOINT AND BALL GROOVES THEREFOR

The present invention relates to constant velocity universal joints, more particularly, to the arrangement of the ball grooves in groups.

One form of a constant velocity universal joint comprises an outer joint member having a bore therethrough with an inner joint member being positioned within the bore. The bore and the outer surface of the inner joint member are each provided with a corresponding number of grooves such that a torque transmitting element which may be a ball is positioned in each pair of opposed grooves. A cage is disposed between the joint members and comprises a plurality of radial openings which retain the balls therein such that the centers of the balls are positioned in a plane perpendicular to the longitudinal axis of the cage and which bisects the bending angle between the inner and outer joint members. The cage may have an inner concave sphericl surface which is guided upon a convex spherical outer surface of the inner joint member or upon a control device positioned on the inner joint member. The cage is also provided with a spherical outer surface which is guided upon the bore surface of the outer joint member. The centers of the cage outer and inner spherical surfaces are positioned equidistantly on opposite sides of the ball plane.

In such joints, the balls are generally symmetrically or uniformly distributed around the circumference of the joint. This arrangement of the balls is disadvantageous in that the alignment or direction control moment of the cage will always vary between zero and a maximum value. The practical effect is that for a constant torque input, the torque output will fluctuate periodically which will cause oscillations in the drive shaft and will impair the smooth operation of the joint.

A further disadvantage of such joints is that large cage control forces inevitably bring about heavy and severe wear between the balls and the cage and thus significantly reduce the useful operating life of the joint.

It is therefore the principal object of the present invention to provide an improved constant velocity universal joint of the type herein described.

It is another object of the present invention to provide such a constant velocity universal joint wherein torque fluctuations are reduced and smooth operation of the joint is improved without any increase in the costs of manufacturing the joint.

The objects of the present invention are achieved and the disadvantages of the prior art are overcome by the improvements in a constant velocity universal joint according to the present invention. Such a constant velocity universal joint as described above and which may have grooves which are parallel to the axis of rotation of the joint or grooves which are curved has a number of torque transmitting balls which is at least six and which is divisible by a whole number larger than one but less than the number of the balls. The balls are so positioned around the axis of the joint that no one ball is diametrically opposed from any other ball. This relationship is achieved by the grooves of each joint element defining an odd number of three or more groups of grooves. The angle between two adjacent grooves in a group of grooves is less than the angle between two adjacent grooves of two different groups of grooves. The angle between two adjacent grooves of two different groups is less than twice the angle between two adjacent grooves in any one group.

This arrangement of grooves will result in the cage alignment control force varying at only a small amplitude. Accordingly, there will be a smoother and quieter operation of the joint and higher torques can be transmitted by the joint. Further, the operating life of the joint will be substantially increased because of the reduced wear between the torque transmitting balls and the cage.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment of the present invention will be described in detail.

Figure 1:
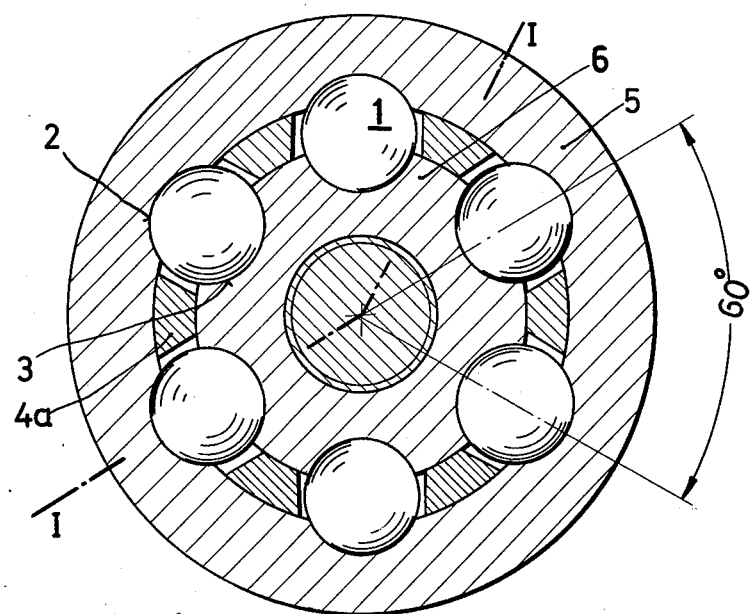
FIG. 1 is a transverse sectional view taken along the line II—II of FIG. 2 and showing a known conventional constant velocity universal joint having six symmetrically spaced balls.
Figure 2:
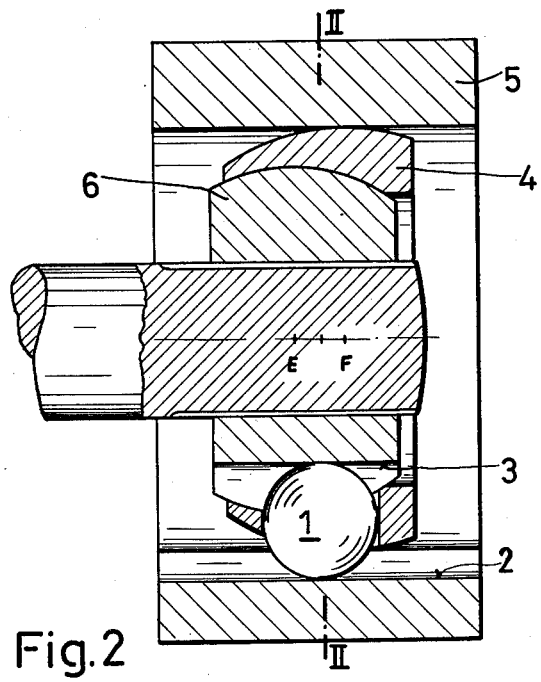
FIG. 2 is a longitudinal sectional view taken along the line I—I and showing a known constant velocity universal joint having cage alignment control based on the offset principle.

The constant velocity universal joint shown in FIGS. 1 and 2 comprises an outer joint member 5 through which is an axially extending cylindrical bore 11. Circumferentially spaced in the surface of the bore 11 is a plurality of ball or track grooves 2 all of which are parallel to the longitudinal axis of the bore. An inner joint member 6 is positioned within the bore 11 and has a spherical outer surface 12 in which are formed a plurality of longitudinally extending ball grooves 3. A ball retainer cage 4 is positioned between the outer joint member 5 and the inner joint member 6. The cage 4 has a spherical concave inner surface 13 which is guided upon the outer spherical surface 12 of the inner joint member 6. Formed in the wall of the cage 4 is a plurality of circumferentially spaced radial openings 14 in which are retained torque transmitting balls 1 each of which is received in 2 mutually opposite ball grooves 2 and 3 of the outer and inner joint members 5 and 6. The cage 4 is further provided with an outer convex spherical surface 15 guided upon the cylindrical surface of the axial bore 11.

In joints of this type, the centers of the radii of curvature of the inner and outer spherical surfaces of the cage 4 are designated at E and F which points are located equidistantly on opposite sides of a plane O passing through the centers of the torque transmitting balls 1.

Figure 3:
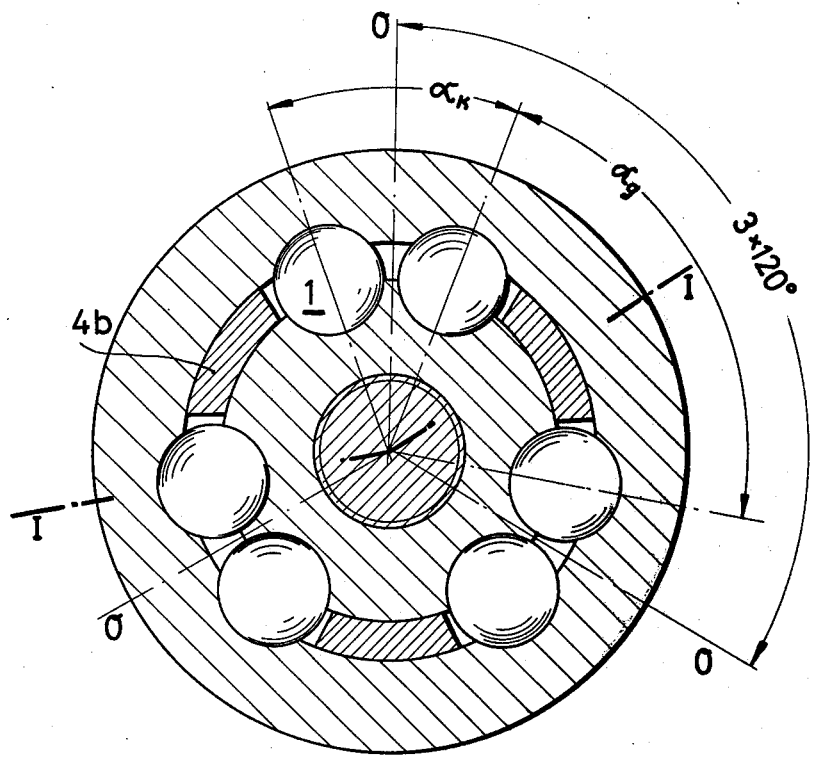
FIG. 3 is a view similar to that of FIG. 1 but showing a constant velocity universal joint according to the present invention wherein the balls are arranged in pairs.

The constant velocity universal joint according to the present invention is shown in FIG. 3 and corresponds essentially to the joint as described above and illustrated in FIGS. 1 and 2. According to the present invention, however, the six torque transmitting balls 1' are grouped in three pairs of balls spaced apart by an angle of 120° between groups and each pair of balls is retained jointly within one of the openings 14' of the cage 4b.

This arrangement of the torque transmitting balls 1' is in accordance with the following mathematical relationships:

$$\frac{n}{n_k} = n_g \quad (I)$$

wherein:
$n$ is the total number of balls in the joint,
$n_k$ is the number of balls in one group of balls,
$n_g$ is the number of groups of balls.

$$\alpha_g = n_k \frac{360 - (n_k - 1)\alpha_k}{n} \quad (II)$$

wherein:
$\alpha_g$ is the angle between two adjacent ball-grooves of two different groups,
$\alpha_k$ is the angle between adjacent ball-grooves in one and the same group.

$$\alpha_k < \alpha_g < 2\alpha_k \quad (III)$$

(IV) The quotient of total number of balls divided by double the number of balls in one ball group must not be a whole number.

Applying the above relationships to the specific construction of the joint as shown in FIG. 3 it will be noted that according to formula (I) for a total number of six balls 1' and two balls per group, the number of groups of balls is three.

The angle $\alpha_g$ which is the angle between adjacent ball grooves of two different groups conforms to formula (II).

The angle $\alpha_k$ between adjacent ball grooves of one group of two grooves will depend on the diameter of the balls 1' used for transmitting torque.

By observing the conditions of formula (III) stating that $\alpha_k$ is less than $\alpha_g$ which in turn is less than twice the angle $\alpha_k$, it is established that in the joint according to FIG. 3 no ball 1' will be positioned opposite or diametrically opposed from another ball 1'.

The present embodiment also conforms to the requirements of formula (IV) since the total number of balls, six, divided by double the number of balls in one group, two times two, will not result in a whole number. It is apparent by observing the conditions of formula (IV) the number of ball groups will always be an odd number.

Figure 4:
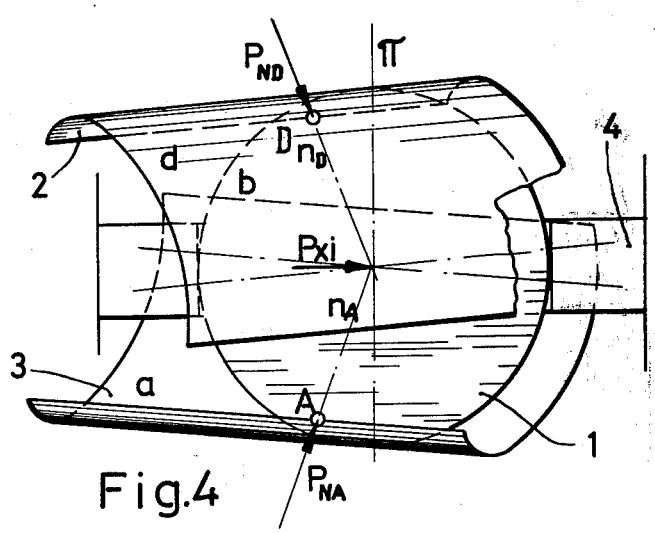
FIG. 4 is a schematic view of the forces in a cage by a ball retained in an opening of the cage.
Figure 5:
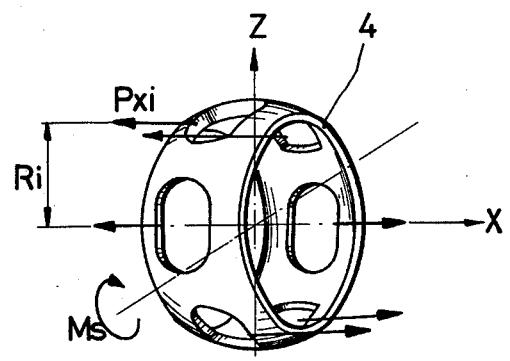
FIG. 5 is an overall perspective view of a cage and showing forces acting upon the cage including the cage alignment control moment.

In the force diagram of FIG. 4, there is shown one groove 2' and 3' of each inner and outer joint members with a ball 1' retained in cage 4b being received within this pair of opposed grooves. The ball 1' will contact the grooves 2' and 3' at points A and D. If a driving torque is introduced through the inner joint member by the normal force $P_{NA}$, this driving torque would be transmitted by the force $P_{ND}$ through the outer joint member. Because of the intersecting relationship of the grooves 2' and 3' which will occur when the joint is bent at an angle, a force $P_{xi}$ will be generated in the direction of the x-axis which will urge the ball 1' against the cage 4b. Because of the vertical distance Ri as shown in FIG. 5, a tilting moment $M_{xi}=P_{xi}.R_i$ to the cage 4b as also shown in FIG. 5. The sum of all of the tilting moments applied will produce the alignment control moment $M_s$ which as may be seen in FIG. 6 varies periodically about an average or mean value in accordance with the angle of revolution of the joint.

Figure 6:
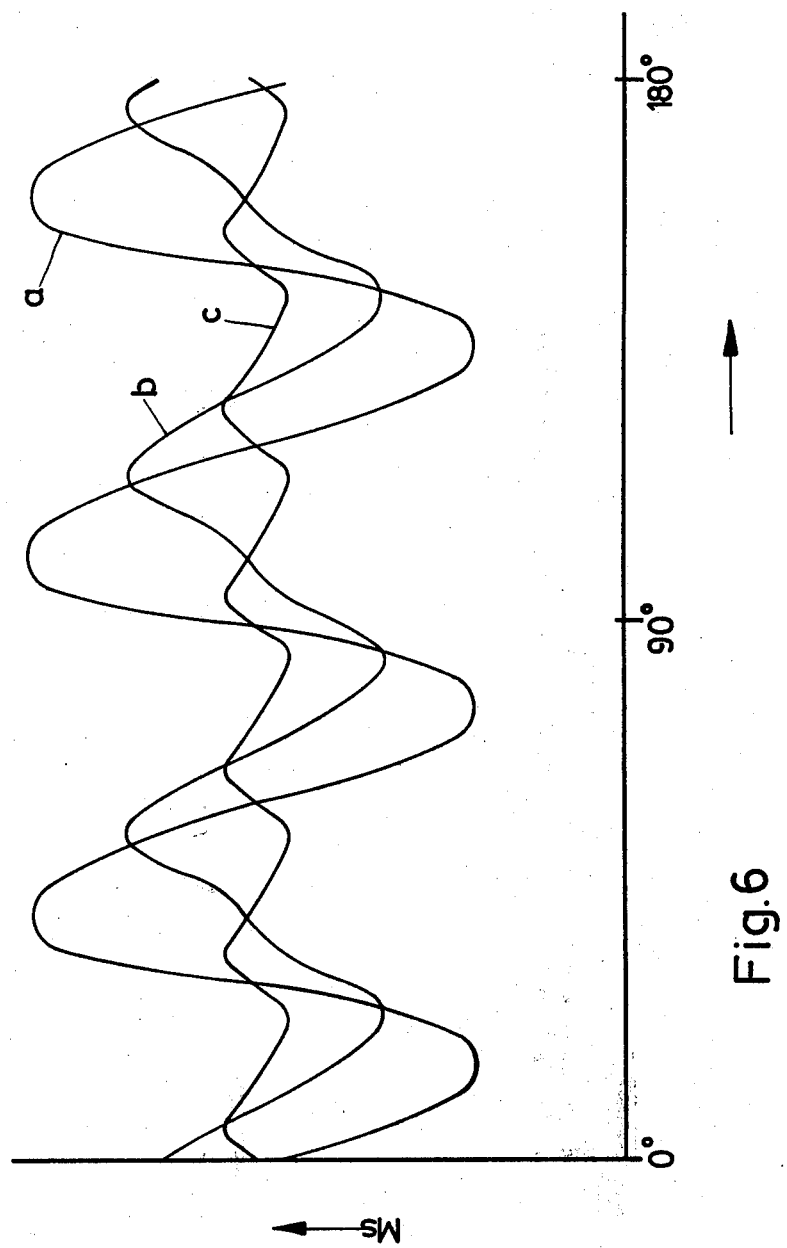
FIG. 6 is a diagram showing the periodic fluctuation of the control moment with respect to the angle of revolution of the joint at different divisional angles of the balls.

The oscillations of the six ball universal joint having a divisional angle $\alpha_k=60°$ is shown in FIG. 6 in curve a, a divisional angle $\alpha_k=45°$ is shown in curve b and a divisional angle $\alpha_k=30°$ is shown in curve c. It will be noted that a six ball joint wherein the balls are arranged in pairs and the divisional angle is 30° has a very low alignment control force $M_s$ and therefore the joint will have considerably improved and uniform operating properties.

Figure 7:
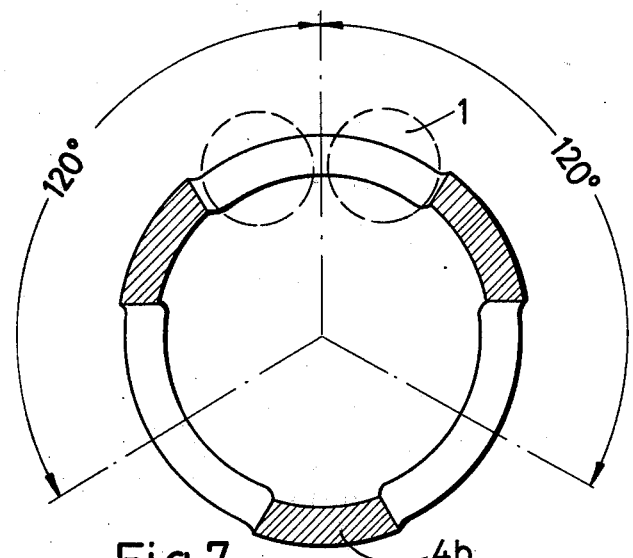
FIG. 7 is a transverse sectional view of a cage according to the present invention.

The cage 4b as shown in FIG. 7 illustrates the three cage openings 14' located at angularly spaced points relatively separated by an angle of 120° and each opening receiving two torque transmitting balls 1'. As a result of this division between the ball openings in the cage the cage 4b can be fabricated by relatively inexpensive manufacturing operations.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint member having a bore therethrough and a plurality of grooves in the surface of said bore, an inner joint member within said bore and having a plurality of grooves in its outer surface corresponding in number to and opposed from said outer joint member grooves to define pairs of opposed grooves, said grooves being one of parallel to the axis of rotation of the joint and curved such that a plane through the central line of each groove passes through the axis of the joint, a plurality of balls between said joint members with each ball being in a pair of opposed grooves, a cage between said joint members and having a plurality of openings therein to retain said balls in a plane which is perpendicular to the axis of the cage and which bisects the angle between the joint members, the number of said balls being at least six and is divisible by a whole number larger than one but less than the number of said balls, said balls being so positioned around the axis of the joint such that no one ball is diametrically opposed from any other ball.

2. A constant velocity universal joint as claimed in claim 1 wherein the grooves of each joint element define an odd number of three or more groups of grooves, the angle between two adjacent grooves in a group of grooves being less than the angle between two adjacent grooves of two different groups of grooves, said angle between two adjacent grooves of two different groups being less than twice the angle between two adjacent grooves in any one group.

* * * * *